(12) United States Patent
Choe et al.

(10) Patent No.: US 8,631,695 B2
(45) Date of Patent: Jan. 21, 2014

(54) EXTENDED VALVE STEM CAP

(75) Inventors: Seunghun Choe, Novi, MI (US);
Hirotake Harada, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 94 days.

(21) Appl. No.: 13/416,021

(22) Filed: Mar. 9, 2012

(65) Prior Publication Data

US 2013/0233068 A1 Sep. 12, 2013

(51) Int. Cl.
*B60C 23/02* (2006.01)
*F16K 15/20* (2006.01)

(52) U.S. Cl.
USPC .................... 73/146.8; 137/223; 152/427

(58) Field of Classification Search
None
See application file for complete search history.

(56) References Cited

U.S. PATENT DOCUMENTS

| | | | |
|---|---|---|---|
| 7,086,411 B2 * | 8/2006 | Uleski | 137/223 |
| 7,086,412 B2 * | 8/2006 | Uleski | 137/223 |
| 7,694,557 B2 | 4/2010 | Hettle et al. | |
| 2002/0124637 A1 * | 9/2002 | Saheki et al. | 73/146 |
| 2005/0087228 A1 * | 4/2005 | Uleski | 137/223 |
| 2005/0087229 A1 * | 4/2005 | Uleski | 137/223 |
| 2007/0295076 A1 * | 12/2007 | Blossfeld et al. | 73/146.8 |
| 2011/0272038 A1 * | 11/2011 | Falkenborg | 137/224 |
| 2012/0137763 A1 * | 6/2012 | Falkenborg | 73/146.8 |
| 2013/0233399 A1 * | 9/2013 | Choe, Seunghun | 137/15.01 |

OTHER PUBLICATIONS

Picture of Valve Stem Cap from http://i00.i.aliimg.com/img/pb/575/233/267/1284529205812_hz-myalibaba-web13_2657.jpg, Jan. 19, 2012, 1 page.
Picture of Valve Stem Cap from http://ecx.images-amazon.com/images/I/416NtSQJD1L._SS400_.jpg, Jan. 19, 2012, 1 page.
Picture of Valve Stem Cap from http://ecx.images-amazon.com/images/I/51j7IxaKYiL._SS400_.jpg, Jan. 19, 2012, 1 page.
Picture of Valve Stem Cap from http://ecx.images-amazon.com/images/I/41sFZEc1GLL._SS400_.jpg, Jan. 19, 2012, 1 page.

* cited by examiner

*Primary Examiner* — Andre Allen
(74) *Attorney, Agent, or Firm* — Young, Basile, Hanlon & MacFarlane, P.C.

(57) ABSTRACT

The disclosed embodiments include a valve stem assembly for a tire pressure monitoring system sensor. The assembly can comprise a valve stem body, and a grommet for purposes of engaging a vehicle wheel. The valve stem body can comprise an attachment end to be attached to a pressure sensor to determine tire air pressure. The valve stem assembly can further comprise a cap that is releasably engaged to the valve stem body which can limit movement of the valve stem assembly relative to the vehicle wheel, the cap having a closed end to cover an air transfer end of the valve stem, and a second open end to overlay the valve stem body and grommet.

18 Claims, 3 Drawing Sheets

EXTENDED VALVE STEM CAP

BACKGROUND

Vehicles are used for transporting people and cargo over land, water and through the air. Vehicles designed for land travel employ various mechanisms to apply steering and driving forces to the ground. Land vehicles may broadly be classified as wheeled, tracked, railed or skied, depending on the mechanism used to apply the steering and driving forces. A wheeled vehicle, for example, may employ wheel assemblies rotatably mounted on an axle attached to the vehicle. The wheel assembly enables the vehicle to move through rotation of the wheel assembly about the axle. A driving force may be applied to one or more of the wheel assemblies to propel the vehicle. The driving force may be generated by a power source, such as an internal combustion engine or electric motor.

Wheel assemblies for use on land vehicles are designed to handle the steering and driving forces normally encountered when operating the vehicle, and to absorb impact forces that may occur as the wheel assembly travels over imperfections in the road surface. The wheel assemblies may include a pneumatic tire mounted on a rim of a wheel. The wheel may be attached to a hub on a vehicle axle.

The tire may be pressurized with air or another gas, such as nitrogen, to provide buoyancy for supporting the vehicle load and cushioning for absorbing shocks caused by imperfections in the road. Air for inflating the tire may be introduced through a valve stem attached to an opening in the wheel adjacent the rim. The valve stem may include a valve that may be opened to admit pressurized gas (i.e., air) to an interior region of the tire, and which automatically closes and is kept sealed by the interior tire pressure, a spring, or both, to prevent the gas from escaping. The valve stem may include a flexible grommet that seals the valve stem against the wheel to prevent pressurized gas from escaping from the tire. The valve stem may be assembled to the wheel by inserting the valve stem through the valve stem opening in the wheel from inside the wheel.

The tire may be inflated to a recommended pressure selected to provide a desired balance between vehicle performance and handling, ride quality, and tire life. For example, an underinflated tire may provide a vehicle operator with a softer ride by decreasing tire stiffness, but may also negatively impact vehicle handling and fuel mileage. Under-inflation may also result in premature tire wear and diminished tire performance in certain operating conditions. Overinflating a tire, on the other hand, may increase tire stiffness and result in a firmer ride. Over-inflation may also have a detrimental effect on tire life and result in decreased tire performance under certain operating conditions.

To monitor and help maintain a tire at a recommended inflation pressure and to alert a vehicle operator of an extreme under-inflation condition, a tire pressure monitoring system (TPMS) may be employed to automatically monitor the inflation pressure. A TPMS electronically monitors a tire inflation pressure. A TPMS may also be referred to as a tire-pressure indication system (TPIS). A TPMS reports real-time tire pressure information to a vehicle operator, typically via a gauge, a pictogram display, or a simple low-pressure warning light. A TPMS may employ a pressure sensor mounted internally within the tire for measuring the tire inflation pressure. The collected pressure data may be transmitted to the vehicle's instrument cluster or a corresponding monitor for viewing by the vehicle operator. Data may be transmitted from the pressure sensor to the monitor or display via a battery powered radio-frequency (RF) communication device. The pressure sensor is generally coupled to the in-tire portion of the valve stem when the tire is mounted to the rim of the wheel.

SUMMARY

The disclosed embodiments include a valve stem assembly for a tire pressure monitoring system. In one embodiment, the valve stem comprises a valve stem body including an attachment end connectable to the tire pressure monitoring system sensor and an opposite air transfer end. Also included is a grommet attached to the valve stem body, the grommet including a first flange and a second flange, each flange extending radially outward from the valve stem body, the first flange disposed between the second flange and the attachment end of the valve stem body. The valve stem further comprises a cap including a closed first end and an open second end, the closed first end releasably engaging the air transfer end of the valve stem body and the open second end overlaying an outer peripheral edge of the second grommet.

In another embodiment, a tire pressure monitoring system assembly comprises a rim for supporting a tire, the rim including an inner surface and an opposite outer surface, and the rim defines a valve stem opening extending from the inner surface to the outer surface. Also included in the system is a tire pressure monitoring system sensor arranged proximate the inner surface of the rim. The tire pressure monitoring sensor system also includes a valve stem body including an attachment end connectable to the tire pressure monitoring system sensor and an opposite air transfer end and extending through the valve stem opening. Further included in the system is a grommet attached to the valve stem body, the grommet including a first flange engaging the inner surface of the rim and a second flange engaging the outer surface of the rim. The tire pressure monitoring sensor system also comprises a cap including a closed first end and an open second end, the closed first end releasably engaging the air transfer end of the valve stem body and the open second end having a distal end positioned proximate to the outer surface of the rim.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
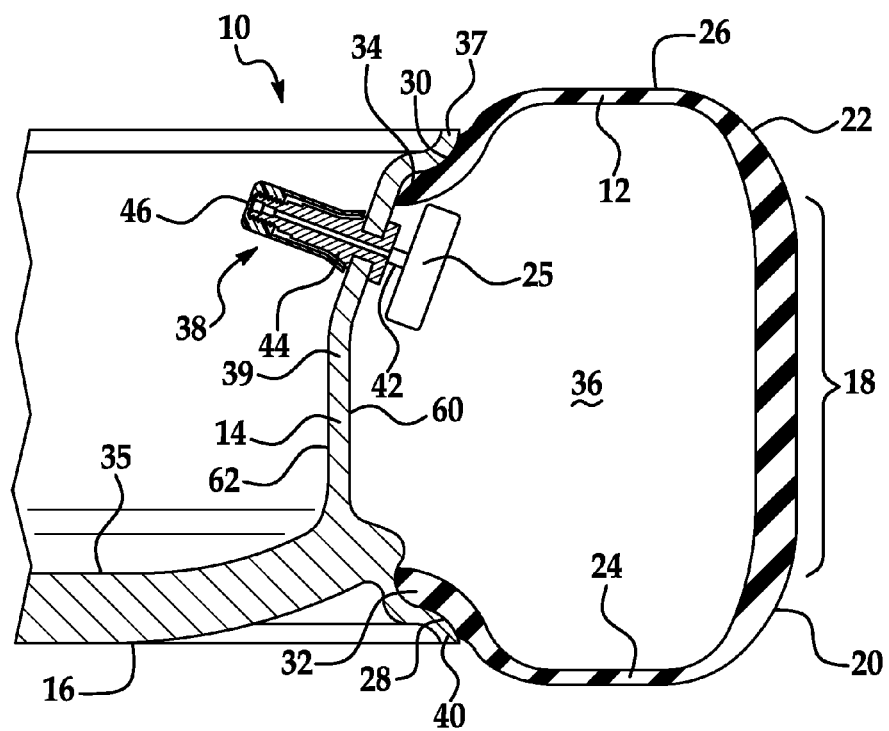
FIG. 1 is a partial cross-sectional view of a vehicle wheel assembly employing an exemplary valve stem having a cap according to an embodiment herein.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIG. 1, an exemplary wheel assembly 10 may include a pneumatic tire 12 mounted on a rim 14 of a wheel 16. The terms "wheel" and "rim" may have inconsistent and overlapping meanings within the industry. For example, it is not uncommon for the terms "wheel" and "rim" to be used synonymously to refer to the entire component to which the tire attaches. Decorative wheels, in particular, are often referred to as "rims". The term "rim" has also been used more narrowly to refer specifically to the outer circumferential portion of the wheel that adjoins the tire. To avoid confusion, the term "wheel" shall be used throughout this application to refer to the entire component to which the tire attaches, and generally includes an inner hub to which an outer rim is attached. The term "rim" refers specifically to the outer circumferential region of the "wheel" that adjoins the tire. The term "wheel assembly" refers to the combination wheel and tire assembly.

With continued reference to FIG. 1, tire 12 includes a tread region 18 that contacts the road surface. Tread region 18 includes various geometrically shaped grooves, lugs and voids that cooperate to channel away water and provide traction under various operating conditions. An inner shoulder 20 and outer shoulder 22 generally delineate lateral edges of tread region 18. Extending radially inward from shoulders 20 and 22 is an inner sidewall 24 and an opposite outer sidewall 26, respectively. Inner sidewall 24 includes an inner bead 28 formed proximate an inner circumferential edge 32 of inner sidewall 24. Outer sidewall 26 includes an outer bead 30 formed proximate an inner circumferential edge 34 of outer sidewall 26. Beads 28 and 30 cooperatively engage rim 14 of wheel 16 to form a generally airtight seal between tire 12 and wheel 16. Tire 12 may be constructed from a flexible elastomer material, such as rubber, with reinforcing materials such as fabric and wire.

Wheel 16 generally includes a hub 35 that connects to and extends radially inward from rim 14. Hub 35 includes features for connecting wheel 16 to a vehicle axle. Attached to an outer perimeter of hub 35 is the generally cylindrically shaped rim 14 to which tire 12 attaches. An outer end 37 of rim 14 engages outer bead 30 of tire 12 and an inner end 40 of rim 14 engages inner bead 28 when tire 12 is mounted to rim 14. Rim 14 includes a wall 39 that extends between ends 37 and 40, and includes an inner surface 60 and an outer surface 62. Tire 12 and inner surface 60 of rim 14 together define and interior region 36 for receiving a pressurized gas, such as air or nitrogen, for inflating tire 12 to a desired inflation pressure.

Wheel 16 may be constructed from multiple stamped, cast and forged parts assembled together to form wheel 16, or may be formed as one continuous part. Wheel 16 may be made from a wide variety of materials, including but not limited to, steel, aluminum and magnesium alloys, and composites.

Tire 12 may be inflated to a desired inflation pressure by introducing a pressurized gas to interior region 36 of tire 12 through a valve stem 38. Valve stem 38 includes a valve 51 (see FIG. 3) that opens to admit the pressurized gas (i.e., air) into interior region 36 of tire 12 to inflate the tire. The valve 51 is generally configured to automatically close and maintain a generally airtight seal in response to pressure within tire 12, a spring, or both, to prevent the gas from escaping. A Schrader valve is an example of one such valve. Schrader valves (also known as American valves) include a valve body into which a poppet valve is threaded with a spring attached. Schrader valves are commonly used in connection with automobile tires.

The inflation pressure of tire 12 may be monitored through use of a tire pressure monitoring system (TPMS), which may be configured to detect a pressure within interior region 36 of tire 12. A TPMS may alternately be referred to as a tire pressure indication system (TPIS). For purposes of discussion, it shall be understood that reference throughout the application to a TPMS system shall also cover a tire pressure indication system (TPIS), as well as other pressure monitoring systems.

Continuing to refer to FIG. 1, a TPMS typically includes a pressure sensor 25 that operates to collect pressure data and transmit the data real-time to an associated receiver. The receiver may display the data to a vehicle operator via a pictogram display, or a simple low-pressure warning light. Pressure sensor 25 may be installed within interior region 36 of tire 12. Pressure sensor 25 may be attached to wheel 16 or to an attachment end 50 of valve stem 38, for example, as illustrated in FIG. 1.

Figure 2:
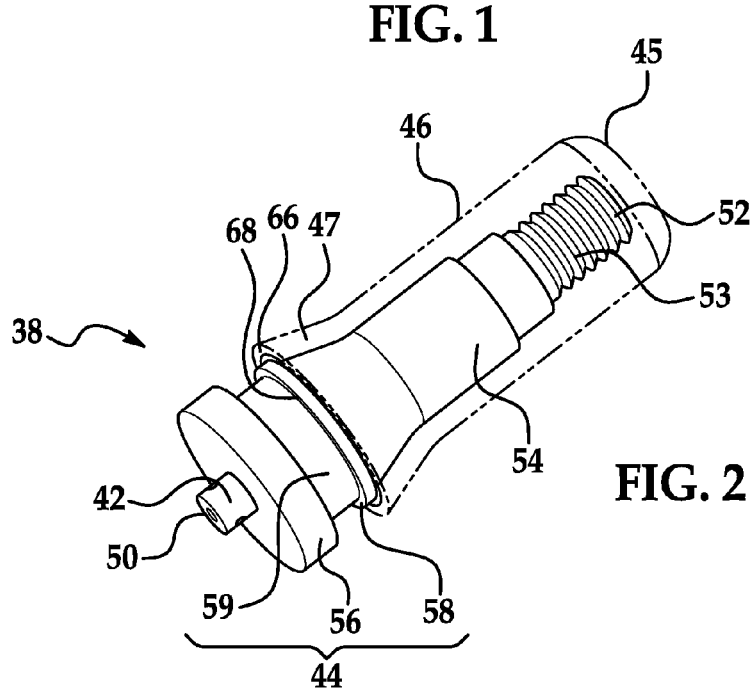
FIG. 2 is a perspective view of the valve stem shown removed from the wheel assembly.

FIG. 2 shows one embodiment of the valve stem assembly 38. The valve stem assembly 38 has a valve stem body 54 which includes an attachment end 50 to engage the pressure sensor 25, and an opposite air transfer end 52. The cap 46 can be releasably engaged to the valve stem body 54. In one example, the cap 46 can be engaged to the valve stem body 54 via a threaded region 53 on the air transfer end 52 of the valve stem body 54 and a correspondingly threaded section 48 on the cap 46, illustrated in FIGS. 3 and 4, such that only a portion of an interior surface 64 of the cap 46 is threaded.

Figure 4:
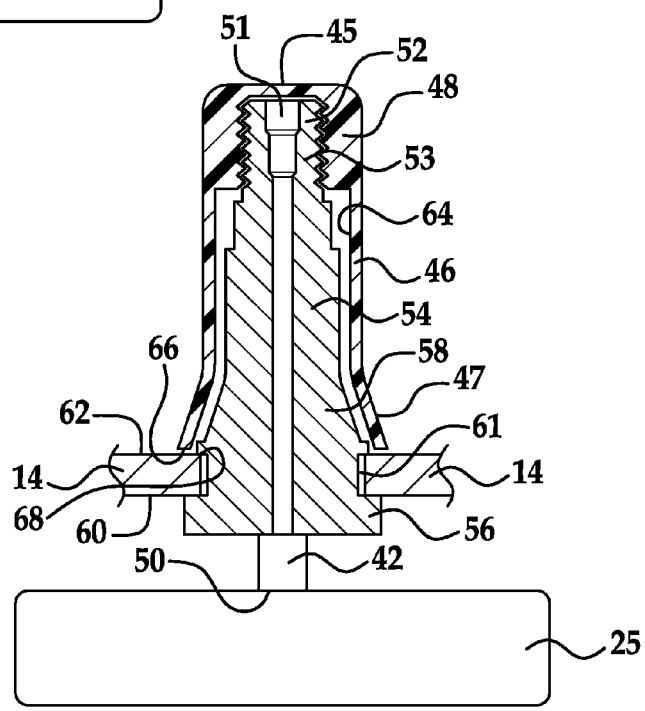
FIG. 4 is a cross-sectional view of the valve stem shown attached to a rim of the wheel assembly.

The valve stem assembly 38 can have a grommet 44 consisting of a first flange 56, a second flange 58, and a neck 59 connecting the first and second flanges 56, 58. Referring to FIG. 4, the grommet 44 can secure the valve stem assembly 38 to the rim 14. The valve stem body 54 and the second flange 58 are forced through the valve stem opening 61 in the rim 14 for receiving the valve stem assembly 38 from the interior region 36 of the tire 18. The neck 59 is sized to span a thickness of the rim 14, such that an inner surface 60 of the rim 14 engages the first flange 56 and an outer surface 62 of the rim 14 engages the second flange 58. The pressure sensor 25 is attached to the attachment end 50 of the valve stem body 54 after the grommet 44 is in place with respect to the rim 14.

Referring back to FIG. 3, the cap 46 can have a closed end 45 and an open end 47. The open end 47 of the cap 46 is sized to fit over the valve stem body 54 and at least a portion of the outer peripheral edge 63 of the second flange 58 of the grommet 44. As illustrated, the interior surface 64 of the cap 46 corresponds to the shapes of the valve stem body 54 and at least a portion of the second flange 58 of the grommet 44. The cap 46 has a generally cylindrical shape between the closed end 45 and the open end 47. The open end 47 can be flared outward to provide a cavity to receive at least a portion of the second flange 58. The threaded section 48 of the cap 46 is positioned proximate to the closed end 45 of the cap 46.

Figure 3:
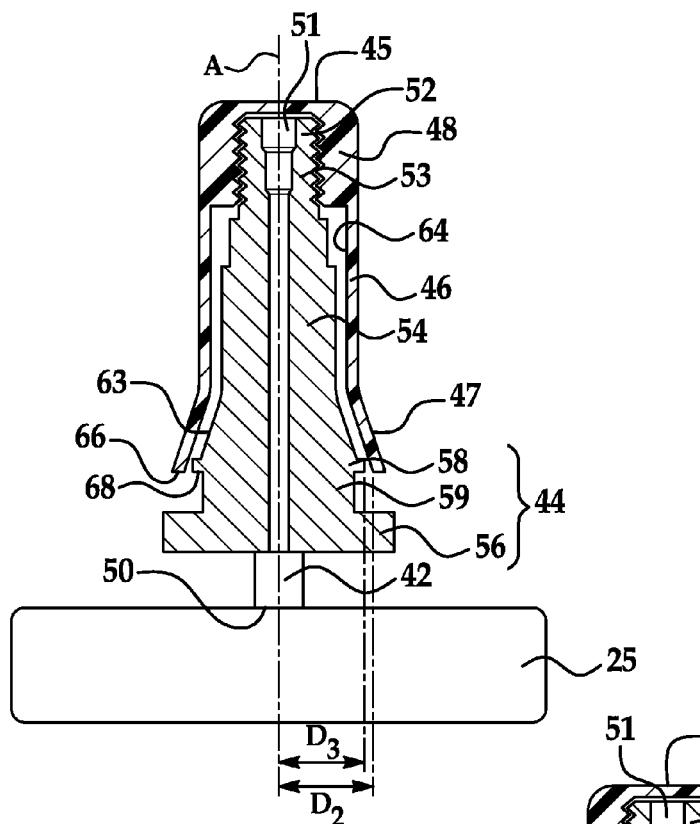
FIG. 3 is a cross-sectional view of the valve stem assembly.
Figure 6:
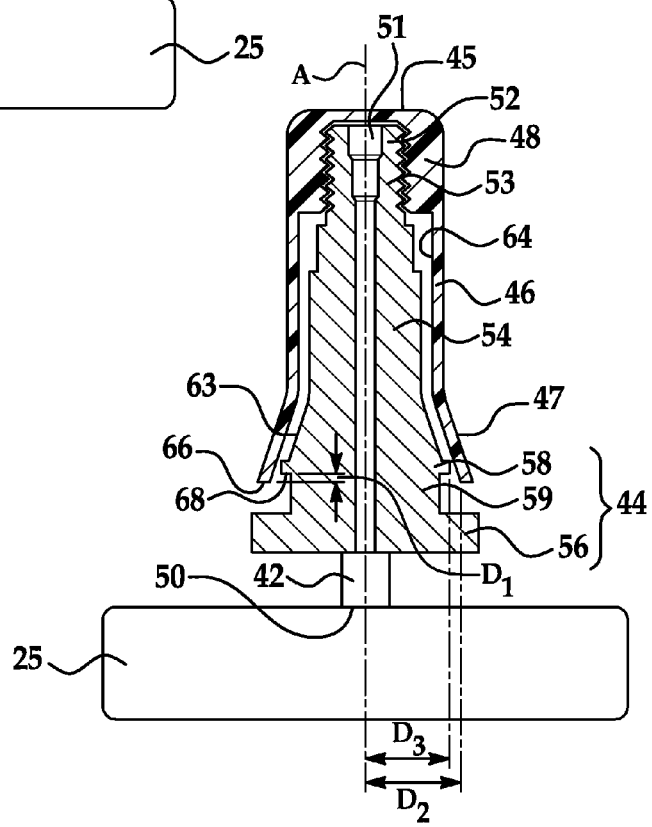
FIG. 6 is a partial cross-sectional view of the valve stem shown removed from the wheel assembly and having another cap according to the present invention.

The open end 47 of cap 46 has a distal surface 66. The length of the cap 46 can be such that the distal surface 66 is in the same plane as the rim-facing surface 68 of the second flange when the cap 46 is fully attached to the valve stem body 54 as shown in FIG. 3. The cap 46 can also have a length such that the distal surface 66 does not extend to the plane in which the rim-facing surface 68 of the second flange 58 is in, as shown in FIG. 4. Alternatively, the distal edge 66 can extend to a point between the plane of the rim-facing surface 68 of the second flange 58 and the first flange 56, as shown in FIG. 6. In other words, the distal edge 66 can extend past the rim-facing surface 68 of the second flange 58 by a distance D1 shown in FIG. 6. In this alternative, the distal edge 66 and the rim 14 would form a tight seal with the outer surface 62, or force the first flange 56 to form a tight seal with the inner surface 60 of the rim 14, when the cap 46 is fully positioned on the valve stem body 54.

The open end 47 of the cap 46 can have an internal diameter that is larger than an outer diameter of the second flange 58. In other words, a distance D2 between an interior surface 64 of the open end 47 of cap 46 and a longitudinal axis A of the valve stem body 54 is greater than a distance D3 between the outer peripheral edge 63 of the second flange 58 of grommet 44 and the longitudinal axis A of the valve stem body 54.

When the pressure sensor 25 is attached to the in-tire portion 42 of valve stem assembly 38 during vehicle operation, the valve stem assembly 38 may be subject to several forces. Due in part to the weight distribution of the valve stem assembly 38 and the pressure sensor 25, with the center of gravity located within the interior region 36, centripetal forces F from the wheel assembly 10 spinning, along with road forces from driving on an uneven surface, can cause forces on the valve stem assembly 38 to pull the valve stem assembly 38 toward the interior region 36. This condition can be most prevalent during high speed operation of the wheel assembly in low temperature conditions. The valve stem assembly 38 and pressure sensor 25 may be displaced longitudinally inward/outward of the rim 14, or may rotate relative to the rim 14, when cap 46 is not installed on the valve stem assembly 38, or when a traditional cap is used. When valve stem assembly 38 moves relative to the rim 14, the grommet 44 may deform or displace, allowing some air to escape from the interior region 36 of tire 12. The relative movement of valve stem assembly 38 and pressure sensor 25 may also result in improper pressure readings by sensor 25 or decreased durability of the valve stem assembly 38 components.

Figure 5:
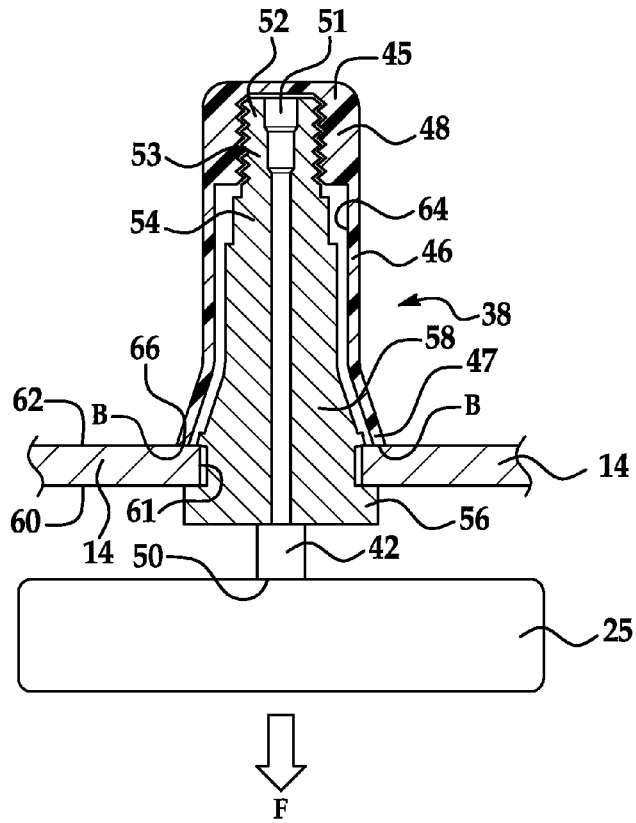
FIG. 5 is a cross-sectional view of the valve stem with cap shown attached to a rim of the wheel assembly during operation.

Referring now to FIG. 5, one embodiment of the valve stem assembly 38 for a tire pressure monitoring system has the cap 46 installed to the valve stem body 54. Under operating conditions, the cap 46 can prevent the valve stem assembly 38 from rotating or moving along the longitudinal axis A of the valve stem assembly 38. Under rotational forces to the wheel assembly 10, the cap 46 may contact the rim 14 at point B as shown in FIG. 5. The contact point B can restrict the movement of valve stem body 54, grommet 44, and tire pressure monitoring system sensor 25, which can alleviate problems with air leakage, variations in pressure readings, and durability of certain components.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A valve stem for a tire pressure monitoring system sensor, the valve stem comprising:
   a valve stem body including an attachment end connectable to the tire pressure monitoring system sensor and an opposite air transfer end;
   a grommet attached to the valve stem body, the grommet including a first flange and a second flange, each flange extending radially outward from the valve stem body, the first flange disposed between the second flange and the attachment end of the valve stem body; and
   a cap including a closed first end and an open second end, the closed first end releasably engaging the air transfer end of the valve stem body and the open second end overlaying an outer peripheral edge of the second flange of the grommet.

2. The valve stem of claim 1, wherein only a portion of an interior surface of the cap includes a threaded region that releasably engages a correspondingly threaded region on the air transfer end of the valve stem body.

3. The valve stem of claim 1, wherein the open second end of the cap has a distal edge and the cap has a length such that the distal edge is co-planar with a rim-contacting surface of the second flange when the cap is fully positioned on the valve stem body.

4. The valve stem of claim 1, wherein a radial distance between an interior surface of the open second end of the cap and a longitudinal axis of the valve stem body is greater than a radial distance between the outer peripheral edge of the second flange and the longitudinal axis.

5. The valve stem of claim 1, wherein the cap overlays the entire valve stem body between the second flange and the air transfer end of the valve stem body.

6. The valve stem of claim 1, wherein a distal edge of the cap extends such that a portion of the second flange is exposed when the cap is fully positioned on the valve stem body.

7. The valve stem of claim 1, wherein the cap overlays substantially the entire valve stem body from and including the second flange and the air transfer end.

8. The valve stem of claim 1, wherein substantially the entire second flange is axially positionable between the closed first end and the open second end of the cap.

9. A tire pressure monitoring system assembly comprising:
   a rim for supporting a tire, the rim including an inner surface and an opposite outer surface, the rim defining a valve stem opening extending from the inner surface to the outer surface;
   a tire pressure monitoring system sensor arranged proximate the inner surface of the rim;
   a valve stem body including an attachment end connected to the tire pressure monitoring system sensor and an opposite air transfer end and extending through the valve stem opening;
   a grommet attached to the valve stem body, the grommet including a first flange engaging the inner surface of the rim and a second flange engaging the outer surface of the rim; and
   a cap including a closed first end and an open second end, the closed first end releasably engaging the air transfer end of the valve stem body and the open second end having a distal end positioned proximate to the outer surface of the rim.

10. The tire pressure monitoring system assembly of claim 9, wherein only a portion of an interior surface of the cap includes a threaded region that releasably engages a correspondingly threaded region on the air transfer end of the valve stem body.

11. The tire pressure monitoring system assembly of claim 9, where the open second end of the cap overlays an outer peripheral edge of the second grommet.

12. The tire pressure monitoring sensor system of claim 9, wherein the cap overlays the valve stem body between the second flange and the air transfer end of the valve stem body.

13. The tire pressure monitoring system assembly of claim 9, wherein substantially the entire second flange is disposed within an interior region of the cap.

14. The tire pressure monitoring system assembly of claim 9, wherein the cap overlays substantially the entire valve stem body from and including the second flange and the air transfer end.

15. The tire pressure monitoring system assembly of claim 9, wherein substantially the entire second flange is axially positioned with the cap.

16. The tire pressure monitoring system assembly of claim 9, wherein the cap includes a generally cylindrical portion extending between the closed first end and the open second end of the cap.

17. The tire pressure monitoring system assembly of claim 9, wherein the second open second end of the cap includes at least one flared region.

18. The tire pressure monitoring system assembly of claim 9, wherein the open second end of the cap engages the outer surface of the rim when the valve stem body moves relative to the valve stem opening.

* * * * *